United States Patent [19]
Murphy et al.

[11] Patent Number: 6,096,096
[45] Date of Patent: *Aug. 1, 2000

[54] WEB-SITE DELIVERY

[75] Inventors: Thomas Patrick Murphy, Lafayette; David Thompson Ratcliffe, Santa Cruz; Andrew J. Cameron, III, Los Gatos; Yusuf M. Attarwala, San Jose, all of Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,731

[22] Filed: Dec. 13, 1996

[51] Int. Cl.⁷ .............................. G06F 9/44; G06F 17/00
[52] U.S. Cl. .................. 717/11; 717/1; 709/217; 709/224; 709/227; 703/23; 707/501; 707/513; 707/10; 345/335; 345/348; 345/357
[58] Field of Search ...................... 345/326, 965–968, 345/961–962, 977, 329, 335, 346, 348; 707/501, 513, 10, 1; 709/227, 217, 220, 222, 224, 232; 705/26, 27; 717/11, 1; 703/23

[56] References Cited

U.S. PATENT DOCUMENTS

| | | | |
|---|---|---|---|
| 5,299,304 | 3/1994 | Williams et al. ...................... | 707/523 |
| 5,361,349 | 11/1994 | Sugita et al. ........................... | 707/8 |
| 5,418,946 | 5/1995 | Mori ........................................ | 707/1 |
| 5,530,852 | 6/1996 | Meske, Jr. et al. .................... | 707/524 |
| 5,654,751 | 8/1997 | Richard, III .......................... | 348/192 |
| 5,691,898 | 11/1997 | Rosenberg et al. ................... | 700/85 |
| 5,712,979 | 1/1998 | Graber et al. ......................... | 709/224 |
| 5,727,159 | 3/1998 | Kikinis ................................... | 709/246 |
| 5,737,560 | 4/1998 | Yohanan ................................ | 345/349 |
| 5,742,768 | 4/1998 | Gennaro et al. ....................... | 709/203 |
| 5,809,250 | 9/1998 | Kisor ...................................... | 709/227 |
| 5,935,210 | 8/1999 | Stark ...................................... | 709/224 |

OTHER PUBLICATIONS

"Quarterdeck and Paradesa Media Introduce The First Multimedia Starter Kit for The Internet," Larry Magid's Essential Internet, PR Newswire, pp. 1030SJ014, Oct. 30, 1995.

Veraart et al., "Using CD–ROMs and Local Web Pages to Provide Course Materials for Distance–students," Proceedings of the Conference on Integrating Technology into Computer Science Education, Jun. 2–6, 1996, Barcelona Spain, pp. 90–92.

Veraart et al., "Supporting Software Engineering Education with a Local Web Site," Proceedings of the 27th SIGCSE Technical Symposium on Computer Science Education, Feb. 15–17, 1996, Phildelphia, PA USA, pp. 275–279.

*Primary Examiner*—Tariq R. Hafiz
*Assistant Examiner*—Tuan Q. Dam
*Attorney, Agent, or Firm*—Wagner, Murabito & Hao LLP

[57] ABSTRACT

A method and system for emulating on-line accessing of information in an off-line environment. In one embodiment, information initially configured to be displayed via an on-line connection is stored onto a plurality of portable storage media. The portable storage media is adapted to be used by an end-user in an off-line environment. Moreover, in the present embodiment, the information is arranged on the plurality of storage media such that off-line accessing of the information emulates on-line accessing of the information. That is, in the present invention, information is presented to an off-line end-user in a manner which emulates the manner in which the same information would have been presented to the end-user in an on-line environment. In one embodiment, the present invention stores Web site information onto the plurality of portable storage media. In so doing, an off-line end-user is able to access conventional Web site information in a manner which emulates typical on-line retrieval of the Web site information.

32 Claims, 3 Drawing Sheets

WEB-SITE DELIVERY

TECHNICAL FIELD

The present invention generally relates to a client-server wide area network environment such as the World Wide Web. More particularly, the present invention relates to a system for generating a Web-site on storage media such that the Web-site is accessible to users without accessing the Internet.

BACKGROUND ART

The proliferation of the Internet, in particular the World Wide Web (hereinafter the Web), makes a large amount of information accessible to anyone connected to the Internet. In order to access the Internet, a user typically subscribes to an on-line service provider. Using, for example, a modem coupled to a computer, the user contacts the service provider who, in turn, connects the user to the Internet. Once the user is coupled to the Internet, the user is said to be "on-line" (a user who is not on-line is referred to as being "off-line"). When on-line, the user is able to access numerous resources available through conduits such as, for example, the Web.

The Web consists, generally, of voluminous "sites". Various Web sites contain information of virtually innumerable type, style, and content. Web sites are often comprised of a plurality of Web documents referred to as Web pages. In general, the layout language for a Web document is Hypertext Markup Language (HTML). Web documents are stored in HTML format in association with "server" software on remote servers. A Web document is given a "Uniform Resource Locator" (URL) which is essentially an address path identifying the server which hosts the desired document plus the location of the document on the server. Using "browser" software, an end-user can send a request from a client computer to access a document stored at a particular URL. Browser software such as Netscape™ Navigator, of Netscape Communications Corporation of Mountain View, Calif., is well known and widely available. When the server receives the user's request, it sends the requested HTML Web document to the client where the document can be displayed. The communications protocol used in making such a request and in transferring Web documents is "Hypertext Transfer Protocol" (HTTP). For more information about the Web, see for example T. Berners-Lee, R. Cailliau, A. Loutonen, H. F. Nielsen, and A. Secret, "The World Wide Web," Communications of the ACM, vol. 37(8), August 1994.

As a theoretical example of a Web site, consider a particular business, Business A, having a Web site dedicated expressly to providing information about Business A. Business A's Web site may contain an introductory Web page describing the general technologies and product areas in which Business A is involved. The introductory Web page may also contain links to other Web pages related to Business A. For example, the introductory Web page may have a link to a separate Web page disclosing financial aspects, such as the annual report, stock price history, and the like, of Business A. By selecting the link, the linked Web page is sent to the client computer and displayed to the end user. Thus, a user initially contacting Business A's introductory Web page may discover various other information about Business A by virtue of the linked nature of the Web.

Although a linked Web document is probably related to the original Web document, the linked Web document may reside separately from the original Web document. That is, the linked Web document may reside in a directory which is physically separate from the directory in which the original Web document is stored. In fact, the linked Web document may even reside in a computer or in hardware separate from the computer or hardware in which the original Web document is stored. Therefore, multiple Web documents may be linked even when the Web documents are not stored contiguously or even proximately. Separate storage of linked Web documents may result from the fact that a particular storage device does not have the capacity to contain all of the linked documents, or from the fact that a collection of linked web documents are maintained and/or owned by another individual and/or company.

Although on-line Web sites have substantial utility as information providers in both personal and professional environments, on-line access is not available to many potential end-users. For example, in government or high security environments, computing terminals are "quarantined" or isolated from the outside world. In such instances, on-line access is not available or is prohibited. Additionally, on-line access is often simply not feasible for any one of numerous reasons. For example, an end-user's hardware/computer system may not be adapted for on-line use, or may operate too slowly to effectively convey information to the end-user over an on-line connection. Likewise, if an end-user's client computer is located very distantly from the server system, on-line access may be prohibitively slow. As yet another example, during peak Internet or on-line use periods, response from the server system may be so greatly delayed as to render on-line retrieval of information impractical.

Thus, a need exists for a system which allows end-users to access Web site information, or other types of information commonly presented in an on-line manner, when the end-user is off-line. A further need exists for a system in which an off-line end-user can access linked information even when the linked information is so voluminous as to necessitate storage on multiple storage devices. Still another need exists for a system in which an off-line end-user accesses information in a manner which emulates on-line retrieval of the information.

SUMMARY OF THE INVENTION

Accordingly, the present invention provides a system which allows end-users to access Web site information, or other types of information commonly presented in an on-line manner, when the end-user is off-line. The present invention also provides a system in which an off-line end-user can access linked information even when the linked information is so voluminous as to necessitate storage on multiple storage devices. The present invention further provides a system in which an off-line end-user accesses information in a manner which emulates on-line retrieval of the information. The present invention achieves the above accomplishments with a portable, off-line, Web site delivery mechanism.

Specifically, in one embodiment of the present invention, information initially configured to be displayed via an on-line connection is stored onto a plurality of portable storage media. The portable storage media is adapted to be used by an end-user in an off-line environment. Moreover, in the present embodiment, the information is arranged on the plurality of storage media such that off-line accessing of the information emulates on-line accessing of the information. That is, in the present invention, information is presented to an off-line end-user in a manner which emulates the manner in which the same information would have been presented to the end-user in an on-line environment. In one embodiment, the present invention stores Web site information onto the plurality of portable storage media. In so doing, an off-line end-user is able to access conventional Web site information in a manner which emulates typical on-line retrieval of the Web site information.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "searching," "retrieving," "prompting," "displaying," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of One Embodiment of the Present Invention

Figure 1:
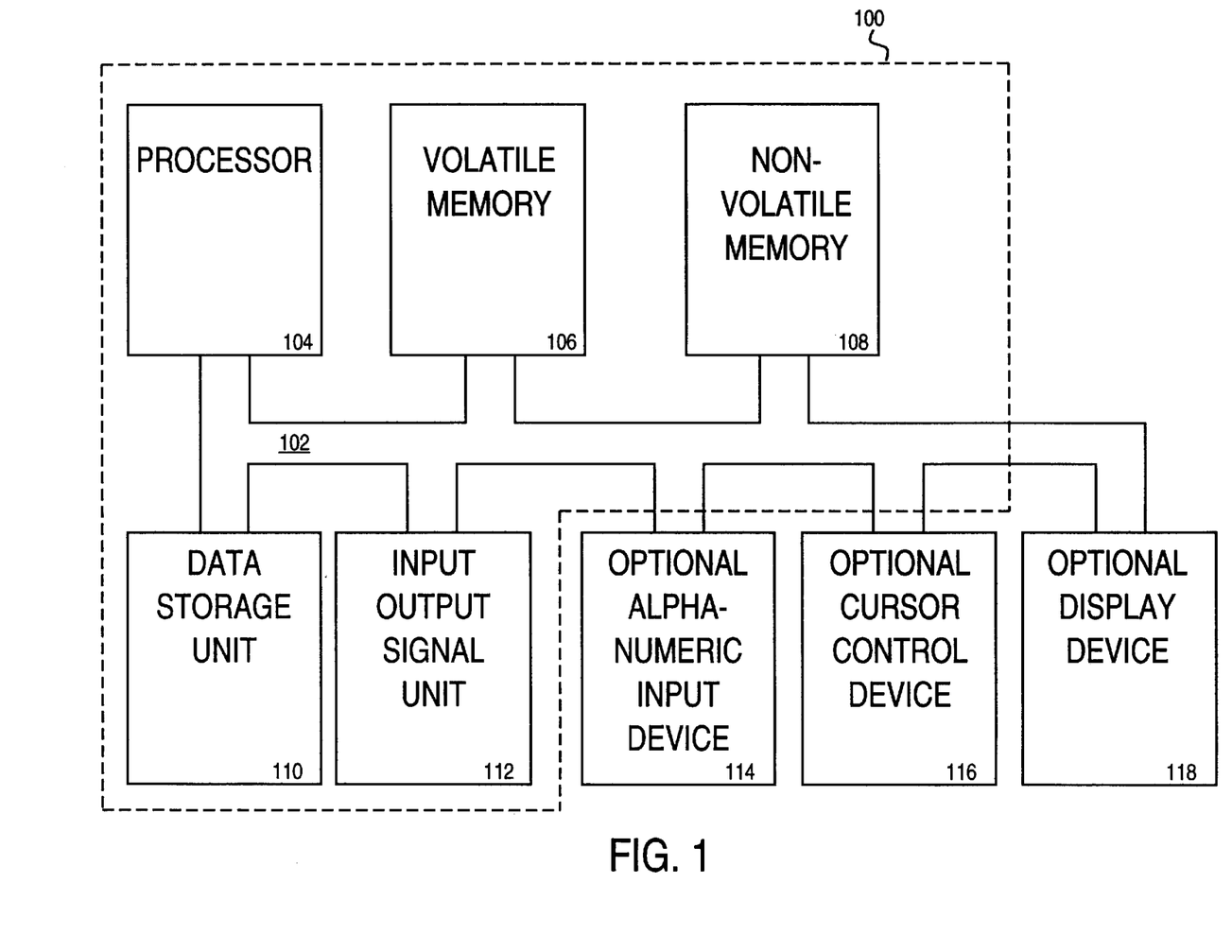
FIG. 1 is a block diagram of a computer system used as a part of a portable, off-line Web site delivery mechanism in accordance with one embodiment of the present invention.

With reference now to FIG. 1, portions of the present portable, off-line Web site delivery mechanism are comprised of computer-readable and computer-executable instructions which are installed into and reside in, for example, computer-usable media of a computer system. FIG. 1 illustrates an exemplary computer system 100 used as a part of a portable, off-line Web site delivery mechanism in accordance with one embodiment of the present invention. It is appreciated that system 100 of FIG. 1 is exemplary only and that the present invention can operate within a number of different computer systems.

System 100 of FIG. 1 includes an address/data bus 102 for communicating information, and a central processor unit 104 coupled to bus 102 for processing information and instructions. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A signal input output comm device 112 (e.g. a modem) coupled to bus 102 is also included in system 100 of FIG. 1. System 100 of the present portable, off-line Web site delivery mechanism also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104. System 100 of the present embodiment also includes an optional display device 118 coupled to bus 102 for displaying information.

Display device 118 of FIG. 1, utilized with the present portable, off-line Web site delivery mechanism, may be a liquid crystal device, cathode ray tube, or other display device suitable for creating graphic images and alphanumeric characters recognizable to an end-user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

The following discussion will begin with astructul description of the structure, function, and advantages of the present invention. This general description will then be followed by a more detailed description setting forth specific aspects of the present invention.

General Description of One Embodiment of the Portable, Off-Line Web Site Delivery Mechanism of the Present Invention In one embodiment of the present invention, information comprising an entire Web site is stored onto a plurality of compact discs. The stored information includes the information which could be retrieved by an end-user accessing the Web site via conventional on-line methods. Such information includes, for example, documents which are linked to the Web site. In so doing, information for a particular Web site, previously only accessible to an on-line end-user, is stored on portable, off-line accessible, storage media. Therefore, the present invention allows an off-line end-user to access the Web site information. Moreover, the present invention allows the off-line end-user to access the Web site information in a manner which emulates on-line accessing of the Web site. As a result, the off-line end-user is able to access, peruse, and retrieve the Web site information just as if the end-user was coupled to the Web site via an on-line connection.

In the present embodiment, an end-user mounts one or more compact discs into the end-user's computer. The present invention allows the end-user to view the Web site information previously stored on the plurality of compact discs as though the end-user was accessing the information on-line. In the present embodiment, if the user seeks to access information which is located on a compact disc other than the compact disc currently loaded in the end-user's computer, the end-user is prompted to load the appropriate compact disc. Once the appropriate compact disc is loaded, the end-user resumes viewing the stored Web site information. The present invention further allows the end-user to search through the entire contents of the stored Web site regardless of which of the compact discs is currently mounted in the end-user's computer. That is, the search engine for the Web site is operable no matter which compact disc is mounted. Similarly, in the present invention, a Web browser and Web server are also operable after installation, no matter which compact disc is mounted. In so doing, the present invention further enhances the end-user's perception that the Web site is being accessed via an on-line connection.

The present invention allows Web site information to be stored and delivered to virtually any off-line, or even on-line, end-user. For example, the present portable, off-line, Web site can be delivered only to paying subscribers. The present portable, off-line, Web site can be delivered to potential end-users who simply lack access to an on-line connection, or to end- user's who suffer from prohibitively slow on-line access times. As a result, the population of potential end-users is vastly augmented. Moreover, the present portable, off-line, Web site delivery system allows the content creator (i.e. author of the Web site) to selectively control the type and content of information presented to specific end-users. For example, information on product prices could be deleted from a portable, off-line, promotional, Web site sent to potential product consumers. Product price information, however, may be expressly included in the portable, off-line, promotional Web site delivered to sales representatives. Hence, the present invention not only enables delivery of a portable, off-line, Web site, but also enables delivery of a customized portable, off-line, Web site to a chosen population of potential end-users.

The present invention allows the content of a particular portable, off-line, Web site to be customized, while maintaining the same source tree. That is, each portable, off-line, Web site originates from the same source tree of information. In so doing, the present invention provides for ease of manufacturability and maintains a constant synchronous base of information even between multiple differing sets of portable, off-line, Web sites or fixed on-line web sites. Thus, any updates or changes to the source tree are available for inclusion on any subsequently created portable, off-line, Web site.

In the present embodiment, a Web site and linked documents are stored on a plurality of compact discs, the present invention is also well suited to storing the Web site and linked documents on a single compact disc. A single compact disc is used when the entire Web site and linked information does not exceed the 640 megabyte storage capacity of a single compact disc. Also, the present invention is also well suited to storing the Web site and linked documents on other portable storage media such as, for example, jaz™ or zip™ drive cassettes (available from Iomega Corporation of Roy, Utah), portable hard disks, floppy disks, and the like. Furthermore, the present invention is also well suited to storing on-line accessible information other than Web sites onto the portable, off-line accessible, storage media.

Detailed Description of the Portable, Off-Line Web Site Delivery Mechanism of the Present Invention In the present invention, in order to accommodate the greatest number of potential end-users, the portable, off-line, Web site is structured so that it can be operated by end-users having as little as a single CDROM drive. As a result, support systems for the present invention cannot execute from any one of the compact discs containing the Web site. That is, the support systems for the present invention must reside other than on the compact discs so that any of the compact discs can be ejected when so prompted by the present invention. Although the following discussion will assume, for purposes of clarity, that the end-user has only a single CDROM drive, the present invention is also well suited for use by end-users having multiple CDROM drives or other methods for simultaneously mounting multiple compact discs. Such methods include but are not limited to mounting different compact discs of different computer systems networked together by, for example, a local area network (LAN).

Because it is more likely potential end-users will have spare local disk space than spare CDROM drives, the present invention uses a small amount of local disk space from which to execute. In the present invention, initialization software, a Web browser, a Web server, and a search server, are provided in the portable, off-line, Web site. The initialization software, Web browser, Web server, and search server are then stored by the end-user onto local disk space such as, for example, data storage unit 110 of FIG. 1. It will be understood that the present invention is also well suited to storing information in, for example, volatile memory 106 or non-volatile memory 108. In the present embodiment, the support system software occupies approximately 10 megabytes of disk space. The present invention is well suited for use with an operating system such as, for example, a Unix operating system, running on a computer system utilizing gigabytes of available disk space. Therefore, the 10 megabytes occupied by the support system of the present invention is not overly burdensome.

The present invention also stores some of the same Web site information on each of the compact discs. The Web site information stored on each of the compact discs is said to reside in "common files". In the present embodiment, the common files are those files containing information which is expected to be frequently accessed or browsed by the off-line end-user. By including the common files on each of the compact discs, the present invention enables an off-line end-user to perform a significant amount of browsing from any particular compact disc without being prompted to mount a different one of the plurality of compact discs. Additionally, the present invention includes on each of the plurality of compact discs, cgi-bin scripts files necessary to globally support the Web server. Common files further include index.html files and other closely coupled html files to provide support for hierarchical browsing. In the present embodiment, a search database is common to all of the compact discs to provide support for random browsing. Standard gif images displayed as part of the index.html files as well as the text-only versions of the html pages are also common to each of the plurality of compact discs in the present embodiment. Although the common files listed above are stored on each of the compact discs in the present embodiment, the present invention is also well suited to storing the common files in local hard disk space. In such an embodiment, the hard disk storage requirements of the present invention would increase, but each of the plurality of compact disks would have more room for storing Web site information.

The present invention also stores related information on the same compact disc whenever possible. In so doing, the present invention increases the chances that an end-user will be able to access desired Web site information without having to mount a different compact disc in the CDROM player.

In the present invention, a virtual document root must be created so that an off-line end-user is able to browse and retrieve Web site information in a manner which emulates on-line accessing of the Web site information. More specifically, the virtual document root must emulate the document root found in the on-line Web site. That is, off-line entered URLs and bookmarks must obtain the same information as on-line entered URLs and bookmarks. In the present invention the use of common files complicates the maintenance of the same document root as there are now multiple logical document paths through which the common files can be located. Namely, the common files reside both on the plurality of compact discs, and at some other logical location within the file structure defining the location of all of the Web site information. In the present invention, the existence of two locations for each common file is hidden from the end-user in order to maintain a unified virtual document root.

Figure 2:
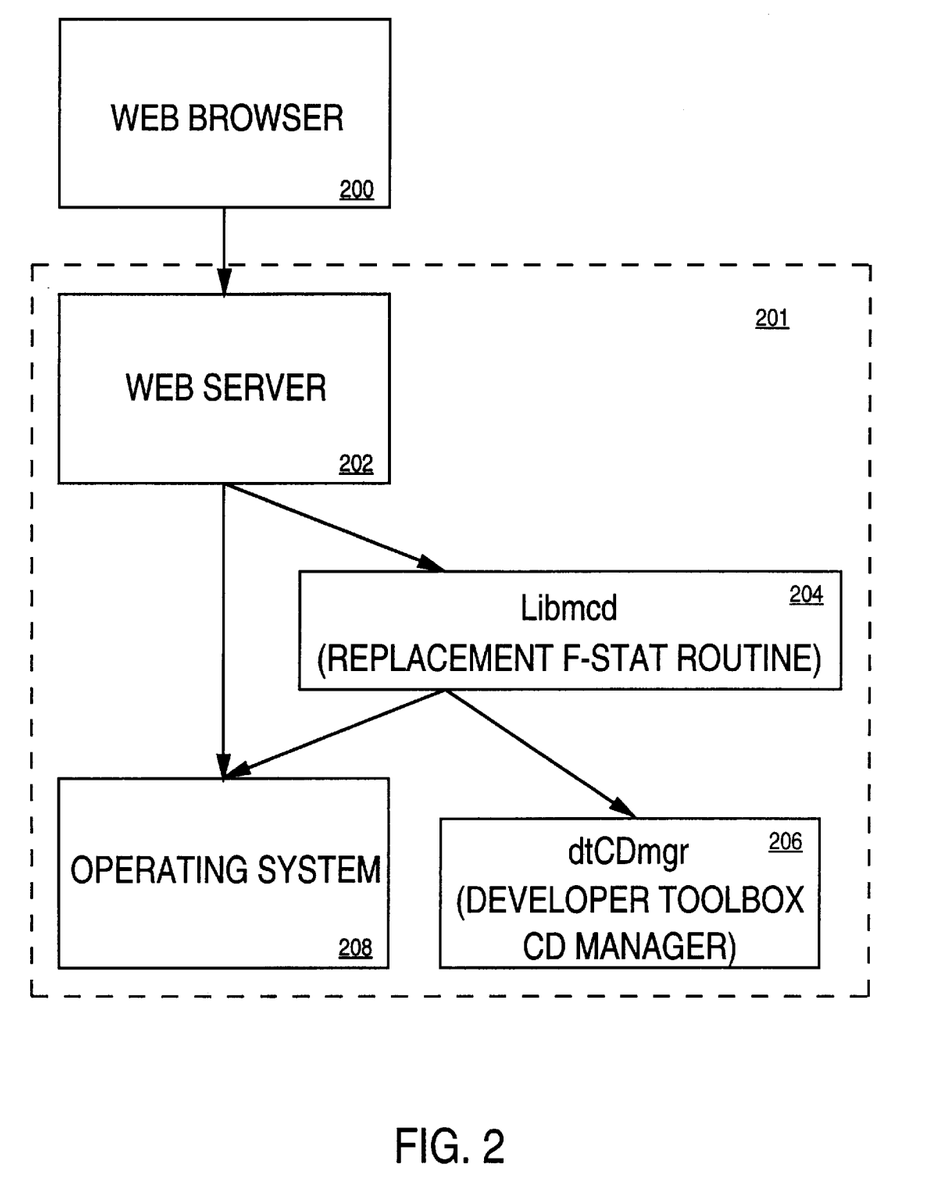
FIG. 2 is a logical diagram of the components used to deliver or access web documents via a virtual document root in accordance with one embodiment of the present invention.

With reference next to FIG. 2, a logical diagram of the components used by the present invention to create the virtual document root is shown. As shown in FIG. 2, the present invention employs Web site delivery components 201, comprised of a Web server 202, a libmcd (replacement fstat routine) 204, a dtCDmgr (developer toolbox manager) 206, and an operating system 208. Web browser 200 is used to access the Web site. For purposes of the present application, developer toolbox refers to the body of data/Web site information present to be stored on the plurality of compact discs. Operation of the above components is discussed in conjunction with the flow chart of FIG. 3.

Figure 3:
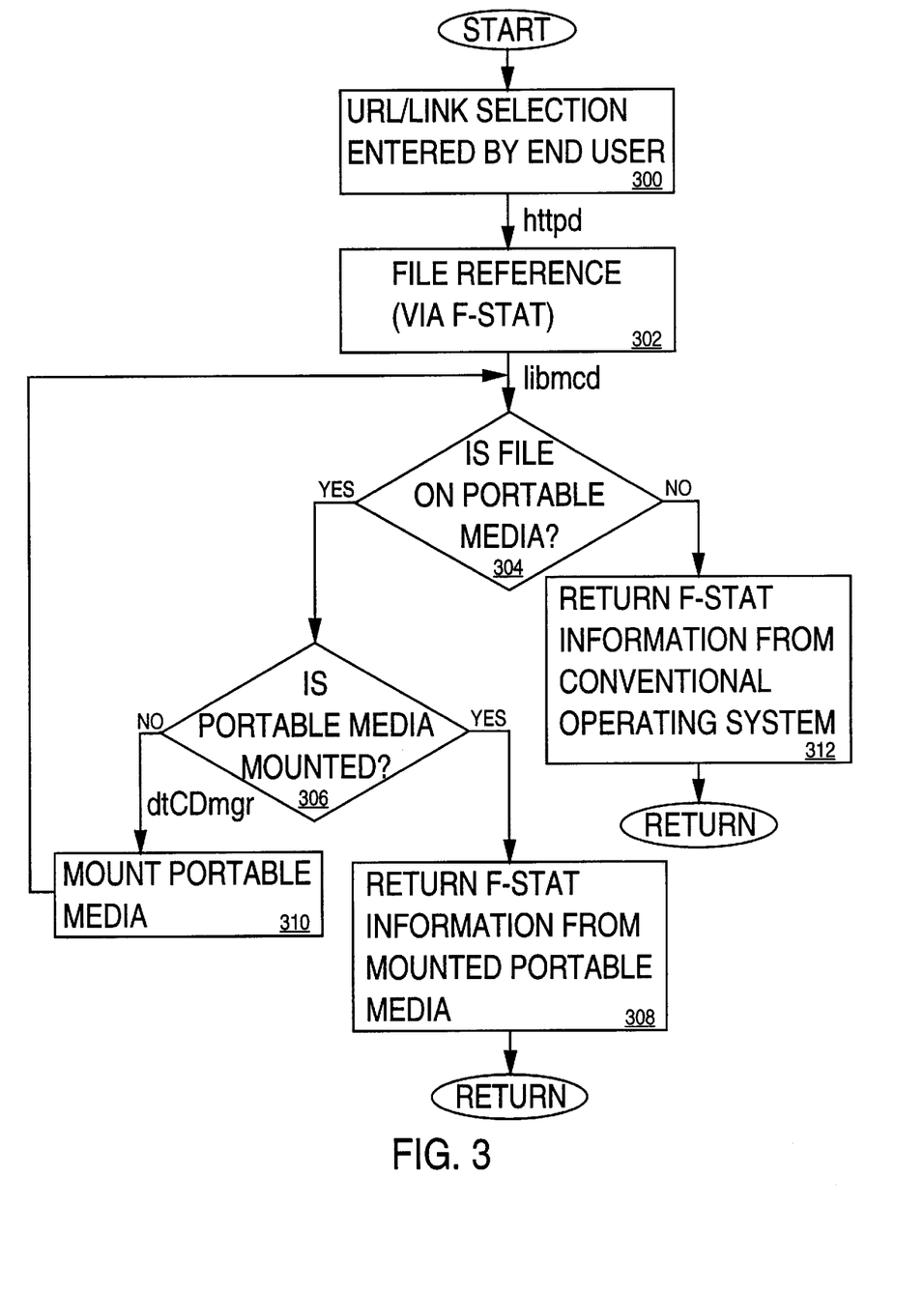
FIG. 3 is a flow chart of steps employed to support the virtual document root in a portable, offline Web site delivery mechanism in accordance with one embodiment of the present invention.

With reference next to FIG. 3, a flow chart of steps followed in the virtual document root of one embodiment of the present invention is shown. The steps of the flow chart of FIG. 3, will be described in conjunction with the components of the logical diagram of FIG. 2. Flow chart 300 includes processes of the present portable, off-line Web site delivery mechanism which, in one embodiment, are comprised of computer-readable and computer-executable instructions. The computer-readable and computer-executable instructions reside, for example, in data storage features such as computer usable volatile memory 106 and/or computer usable non-volatile memory 108. Additionally, the present invention is well suited to having the computer-readable and computer-executable instructions reside, for example, in data storage unit 110, and/or on other data storage media of other computer systems coupled to computer system 100 via, for example, a local area network (LAN). The computer-readable and computer-executable instructions are used to control, for example, the operation and functioning of central processor unit 104. As shown in step 300, once the end-user has mounted a compact disc of the portable, off-line, Web site, the end-user then selects a particular link, icon, or the like, displayed to the end-user on, for example, optional display device 118. The end-user selects a particular link, icon, or the like using, for example, optional alpha-numeric input device 114 or optional cursor control device 116, of FIG. 1. Web browser 200 communicates the information request to a http daemon (httpd) Web server 202.

In step 302, httpd 202 installs a replacement fstat routine, libmcd 204. The first time libmcd 204 is invoked, it determines the location of the original fstat routine, not shown, and stores that location. In the present invention, this is accomplished through the use of a Dynamic Shared Object (DSO) when the http daemon is first put into execution.

Next, at step 304, Libmcd 204 determines whether the file resides on any of the plurality of compact discs. If the file does reside on any one of the compact discs, the present invention proceeds to step 306.

At step 306, libmcd 204 determines if the file resides on the compact disc which is currently mounted. If the appropriate compact disc is mounted, httpd server 202 then calls the original fstat routine, not shown, (which was saved when the http daemon was first started), calls an fopen command, retrieves the data in the file via operating system 208, and the data flows to Web browser 200 as shown in step 308. The data is then displayed to the end-user via, for example, optional display device 118 of FIG. 1.

Referring again to step 306, if the file is not located on the currently mounted compact disc, a compact disc manager, dtCDmgr 206, prompts the user to mount the appropriate compact disc as shown in step 310. This mounting can be via the same CD ROM device, another CD ROM device attached to the same machine or another machine, or on data storage media on the same machine or on other LAN connected machines. Upon finding the appropriate compact disc mounted, the present invention proceeds as described above. In so doing, the present invention maintains a virtual document root which emulates on-line accessing of a Web site.

If, at step 304, libmcd 204 determines that the end-user selected information is not on any of the plurality of compact discs containing the present Web site information, the present invention proceeds to step 312. At step 312, the present invention returns the fstat information from the operating system 208 of the present invention. If the desired information is not available via operating system 208, or otherwise available to the end-user, the Web server 202 returns a "file not found", "URL not located", or similar message, to the end-user via browser 200.

Virtual Document Root Design

In the present invention, the virtual document root is fundamentally composed of a symbolic link (symlink) to any one of the mounted compact discs in order to provide access to the common files. A symlink is said to be "dangling" when the symlink points to information which is not presently available. Once the symlink points to information which is presently available, the symlink is said to be static. In the present invention, a dangling symlink occurs when the symlink points to Web site information residing on a compact disc which is not currently mounted. Additionally, the virtual document root of the present invention is further comprised of a toolbox directory composed of symlinks to files and directories on the compact discs. These symlinks are static links which are created when the portable, off-line, Web site is created during the installation of the present invention. In the present embodiment, installation of the present invention occurs when the end-user starts the browsing process which first causes the Web server 202 to be initiated, followed by the initiation of the Web Browser 200. That is, the installation of the present invention happens in the background and is, thus, hidden from the end-user. As a result, the present invention appears to the end-user to emulate accessing a Web site using a standard on-line connection.

In a Web site having, for example, 24 thousand files, it could take tens of minutes and hundreds of megabytes of disk space to build a complete file-by-file linked tree. Such requirements are prohibitively burdensome to be used in the present embodiment of the present invention. Thus, the present invention employs a different method to build directories and subdirectories of the Web site information stored of the plurality of compact discs. In the present invention, there are large "chunks of data" collectively located on a particular compact disc (e.g. all of a directory and its subdirectories). The present invention creates a single symbolic link to the top directory of these "chunks". Any files above a chunk are linked on a file-by-file basis. For instance, any files in the parent directories of a chunk directory are linked on a file-by-file basis.

With respect to common files, the present invention sets file-by-file links for common files which reside above a chunk. Within a chunk, a directory link already claims the namespace of any common files. We are thus forced into creating a separate namespace for the common files. In order to maintain the same document root and the same source tree structure, the present invention identifies the common files and creates a separate common directory during the building of the compact disc image of the source tree. The present invention keeps the same namespace by having an fstat replacement see if the desired file is really in the common directory. If the file is in a common directory, the replacement fstat rewrites the path to the file. The present invention does not actually have a separate common directory, just a virtual directory. That is, in the present invention, the common files and the local files (files found only on one of the plurality of compact discs) are mixed together in their appropriate directories. In so doing, the present invention eliminates the need to worry about the efficiency of linking common files between the two structures, because the common files and the local files are part of the same structure. In the present embodiment, the chunk directory symlink and the symlink of the common directory together supply all necessary paths to files which the fstat mechanism combines to form the virtual document root.

The present invention further improves file linkage by replacing the entire symlink mechanism with a similar tree which only defines the correct compact disc at a particular directory. As a result, the present invention only requires linking to that compact disc as if it represented the entire document root. The present invention achieves this accomplishment by knowing beforehand that the existing file will be found there.

Implementation Details of the Present Invention

The following description sets forth the specific implementation details of the portable, off-line, Website mechanism of the present invention. It should be noted, as mentioned above, that the present invention does not require any changes to an existing source tree of a Web site. At the top of a chunk, the present invention adds a file, CHUNK, containing either the compact disc number to which the chunk should go, or the word "common". In the present embodiment, it is possible for a given file to have more than one CHUNK file appear in any directories of its path. The CHUNK file of the directory closest to the file defines the CHUNK to which the file really belongs and thus the compact disc or discs to which it will go.

When common files reside within an uncommon CHUNK, the present invention specifies the common files using a COMMON Makefile macro. The COMMON Makefile macro lists common files of a directory. In the present embodiment, it is not necessary to add the file name "index.html" since it is implicitly presumed. It should be further noted that in the present invention, HTML file references can have absolute or relative links between CHUNKs. No referencing restrictions arise in the present invention.

The present invention also defines developer toolbox common Makefile include rules, "dtmaincommonrules", which manage the various chunks. The present invention writes a file "dtdefs_chunk" corresponding to the CHUNK files. The dtdefs_chunk file contains a line of the form:

DT_CDNUM=<cd_number> or of the form

DT_CDNUM=common depending on whether the CHUNK file contains a number or the string "common". In so doing, the present invention defines the compact disc on which files of the chunk will go. In the present embodiment, "CD" is an abbreviation for compact disc, and "DT" is an abbreviation for developer toolbox.

In the present embodiment, it is also possible to direct where a specific file should go via an explicit call to the image command in a Makefile. The image command is used to place files in multiple different directory structures to be used with corresponding fixed or portable Web sites. In the present invention, this is typically done via the alt_image target. In the present embodiment, either the -cdnum option to the image command is used, or else the file inherits a -cdnum option from the nearest enclosing chunk. If the -cdnum value differs from that of the nearest enclosing chunk, then a linkChunks entry will be made to handle locating this file at libmcd time. The directories of the CHUNK files are then used to. write the script linkChunks which become part of the viewDT directory. In the present invention, the mapping between a path in the document root and a compact disc is specifically generated as a part of the initialization.

The present invention also writes the file cd_list at the top of the DT workarea. The image command of the present invention uses this file to know whether a file is in a chunk or not and the compact disc number associated with each file.

In the present invention, a dtcommon command conditionally includes files of the form "dtdefs_chunk" as it currently does with "dtdefs" files. The present invention further includes a "dtdefs_chunk" at the same point a "dtdefs" file would be included.

In the present invention, if the macro is DT_CDNUM, the option -cdnum $(DT_CDNUM) is appended to the IMGOPTS macro. This macro will be set when this directory is under control of a chunk. Appending to IMGOPTS serves to ensure all the files of this directory will go to the compact disc of the chunk. The present invention is, however, well suited to overriding such an approach. The IMGOPTS macro provides an alternate vehicle for supplying command line arguments to the image command.

The present invention also adds the macros PUTC, PUT0, PUT1, . . . PUT10 which respectively put the designated file on all compact discs, just CD 0, . . . , just CD 10, for example.

When the image target is processed in the present embodiment, the macro COMMON is used to image the files listed with the -cdnum common option added to the image command line, thus insuring each of these files is copied to every compact disc. The present embodiment accomplishes this task using the Makefile macro PUTC. Additionally, the present invention also automatically appends the file index.html, if it exists, to the Makefile macro COMMON.

In the present invention, when in CD mode (i.e. when processing the source tree to make a CD image tree), image files to top level directories "cd0", "cd1", etc., are based on the presence of the -cdnum option. These will typically be set via the IMGOPTS Makefile macro. In the present embodiment, if a file has the -cdnum common option then it is imaged to every cd directory. In the present invention, the division between common files and regular files can be exploited to form a Web page with all the structure and little of the content which should be usable externally, i.e. not requiring the secure Web server, as a form of advertising for the toolbox.

The present invention also employs an image command. In the present embodiment, the image command must know whether a file resides inside a chunk or not. If a file resides outside of a chunk then an entry for the file must be written to linkChunks. In either case the file must be imaged to the appropriate spot. If it is outside of any chunk and if it is not common, then it is reported as an error. The image command uses this same data to know whether a symbolic link (-lns) or a hard link (-ln) type file needs to do a link, i.e. are both files are on the same cd, or does a copy need to be made.

In the present libmcd 204 of FIG. 2 is the dynamic shared object (DSO) which captures the fstat call from the http server. It is where much of the work is done to create the virtual document root. In the present embodiment, libmcd must make a call to the real fstat, i.e. the original fstat. The logic followed by libmcd in the present invention is as follows:

If the path is outside of the document root, Libmcd returns the results of the original fstat.
Now the correct CD number must be defined and a new fstat call must be made relative to it.
  If it is a reference to a directory of the form /cd<n> or /ext_cd<n> or /ext_cd<n>, the correct CD number is known.
    If the original fstat was successful, return.
    Else mount the correct CD.
  Else If it is a reference to a directory starting with toolbox then
    If a file_CD can be located in the cdspace directory corresponding to one of the directories of the path, then this file states the correct CD number.
    If the original fstat was successful, return.
    Else If the correct CD is already mounted, link toolbox to it, fstat and return.
    Else mount the CD.
  Else return the results of the original fstat.
Else return the results of the original fstat.
Now verify a correct CD is not already mounted.
If a fstat of the top directory of the CD succeeds.
  If a CD sequence file is found in the top directory, then the correct CD was in place, the file doesn't exist. Return the original fstat.
  Else If the fstat failure for any reason other than file not found, return.
Now attempt to mount the correct CD by calling dtCDmgr.
  If the file was a global file, make sure toolbox is linked to any DT CD
  Else make sure toolbox is linked to the correct CD.

Hence libmcd performs the magic of the virtual document root. The static work of the present invention is done by the mapping of chunks to a specific cd provided by the cdspace directory.

Furthermore, in the present invention, the viewDT routines need to be modified to call linkChunks in the script installServer. Additionally, the viewDT routine must read the $HOME/.dtcdresource and set up the initial links from the virtual document root into those CDROM paths which actually have a DT CD associated with them. The $HOME/.dtcdresource file defines the locations where the DT CDs have been located in the past. This saves the user from having to respecify them with each invocation of the viewDT routine.

Thus, the present invention provides a system which allows end-users to access Web site information, or other types of information commonly presented in an on-line manner, when the end-user is off-line. The present invention also provides a system in which an off-line end-user can access linked information even when the linked information is so voluminous as to necessitate storage on multiple storage devices. The present invention further provides a system in which an off-line end-user accesses information in a manner which emulates on-line retrieval of the information.

The preferred embodiment of the present invention, a server storing instruction codes to dynamically generate graphics for transmission over the Web, is thus described. While the present invention has been described in particular embodiments, the present invention should not be construed as limited by such embodiments, but rather construed according to the below claims.

What is claimed is:

1. A method for emulating on-line accessing of information in an off-line environment comprising the steps of:

storing onto portable storage media, information configured to be displayed via an on-line connection, said portable storage media adapted to be used by an end-user in an off-line environment;

arranging said information on said portable storage media, wherein off-line accessing of said information emulates on-line accessing of said information such that linked information can be accessed in said off-line environment in the same manner as said linked information would be accessed via said on-line connection; and establishing a virtual document root for said information stored on said portable storage media, said virtual document root emulating the document root for said information when accessed via said on-line connection.

2. The method for emulating on-line accessing of information in an off-line environment as recited in claim 1 wherein said step of storing information onto portable storage media further comprises the step of:

storing Web site information onto said portable storage media.

3. The method for emulating on-line accessing of information in an off-line environment as recited in claim 2 further comprising the step of:

storing Web site information onto a compact disc.

4. The method for emulating on-line accessing of information in an off-line environment as recited in claim 1 wherein said step of storing information onto portable storage media further comprises the step of:

storing said information onto said portable storage media from the same source tree used to create said information configured to be displayed via said on-line connection.

5. The method for emulating on-line accessing of information in an off-line environment as recited in claim 1 wherein said step of arranging said information on said portable storage media such that off-line accessing of said information emulates on-line accessing of said information further comprises the steps of:

storing said information onto a first and a second portable storage media; and guiding an end-user to access said second portable storage medium when said information requested by said end-user is not on said first portable storage medium presently in use by said end-user.

6. The method for emulating on-line accessing of information in an off-line environment as recited in claim 5 wherein said step of arranging said information on said portable storage media such that off-line accessing of said information emulates on-line accessing of said information further comprises the step of storing common files on each of said first and second portable storage media such that said common files are accessible to an end-user regardless of which of said first and second portable storage media is presently in use by said end-user.

7. The method for emulating on-line accessing of information in an off-line environment as recited in claim 1 further comprising the step of:

storing information from a computer system onto said portable storage media, said information for facilitating off-line accessing of said information by an end-user, said information adapted to be transferred from said portable storage media to local storage space of another computer system used by said end-user to access said information.

8. The method for emulating on-line accessing of information in an off-line environment as recited in claim 1 further comprising the step of:

storing initialization software, a Web browser, a Web server, and a search server onto said portable storage media.

9. A computer-usable medium having computer-readable program code embodied therein for causing a computer to perform the steps of:

providing access to information stored onto portable storage media, said information configured to be displayed via an on-line connection, said portable storage media adapted to be used by an end-user in an off-line environment;

displaying said information to said end-user in said off-line environment to emulate accessing said information via an on-line connection such that linked information can be accessed in said off-line environment in the same manner as said linked information would be accessed via said on-line connection; and accessing said information stored on said portable storage media via a virtual document root which emulates a document root of said information when accessed via said on-line connection.

10. The computer-usable medium of claim 9 further having computer-readable program code embodied therein for causing a computer to perform the step of:

providing access to Web site information stored onto said portable storage media.

11. The computer-usable medium of claim 10 further having computer-readable program code embodied therein for causing a computer to perform the step of:

providing access to Web site information stored onto a compact disc.

12. The computer-usable medium of claim 9 further having computer-readable program code embodied therein for causing a computer to perform the step of:

retrieving from said portable storage media, initialization software, a Web browser, a Web server, and a search server; and locally storing said initialization software, said Web browser, said Web server, and said search server with respect to said end-user.

13. A computer system comprising:

a processor;

an address/data bus coupled to said processor;

a computer readable memory coupled to communicate with said processor, said processor for performing the steps comprising of:

providing access to information stored onto portable storage media, said information configured to be displayed via an on-line connection, said portable storage media adapted to be used by an end-user in an off-line environment;

displaying said information to said end-user in said off-line environment to emulate accessing said information via an on-line connection such that linked information can be accessed in said off-line environment in the same manner as said linked information would be accessed via said on-line connection; and accessing said information stored on said portable storage media via a virtual document root which emulates a document root of said information when accessed via said on-line connection.

14. The computer system of claim 13 wherein said processor is further adapted to perform the step of:

providing access to Web site information stored onto said portable storage media.

15. The computer system of claim 14 wherein said processor is further adapted to perform the step of:

providing access to Web site information stored onto a compact disc.

16. The computer system of claim 13 wherein said processor is further adapted to perform the steps of:

retrieving from said portable storage media, initialization software, a Web browser, a Web server, and a search server; and locally storing said initialization software, said Web browser, said Web server, and said search server with respect to said end-user.

17. A method for transporting a Web site, via portable storage media, from one computer system to another computer system comprising the steps of:

storing from a first computer system, onto portable storage media, information configured to be displayed via an on-line connection;

arranging said information on said portable storage media, wherein off-line accessing of said information emulates on-line accessing of said information such that linked information can be accessed in said off-line environment in the same manner as said linked information would be accessed via said on-line connection;

loading said information from said portable storage media into a second computer system, wherein off-line accessing of said information from said second computer system emulates on-line accessing of said information from said first computer such that linked information can be accessed in said off-line environment in the same manner as said linked information would be accessed via said on-line connection; and establishing a virtual document root for said information stored on said portable storage media, said virtual document root emulating the document root for said information when accessed via said on-line connection.

18. The method for transporting a Web site, via portable storage media, from one computer system to another computer system as recited in claim 17 wherein said step of storing information onto portable storage media further comprises the step of:

storing Web site information onto said portable storage media.

19. The method for transporting a Web site, via portable storage media, from one computer system to another computer system as recited in claim 18, further comprising the step of:

storing Web site information onto a compact disc.

20. The method for transporting a Web site, via portable storage media, from one computer system to another computer system as recited in claim 17 wherein said step of storing information onto portable storage media further comprises the step of:

storing said information onto portable storage media from the same source tree used to create said information configured to be displayed via said on-line connection.

21. The method for transporting a Web site, via portable storage media, from one computer system to another computer system as recited in claim 17 wherein said step of arranging said information on said portable storage media such that off-line accessing of said information emulates on-line accessing of said information further comprises the steps of:

storing said information onto a first and a second portable storage media; and arranging said information on said first and second portable storage media such that an end-user is prompted to access said second portable storage medium when said information requested by said end-user is not on said first portable storage medium presently in use by said end-user.

22. The method for transporting a Web site, via portable storage media, from one computer system to another computer system as recited in claim 21 wherein said step of arranging said information on said storage media such that off-line accessing of said information emulates on-line accessing of said information further comprises the step of:

storing common files on each of said first and second portable storage media such that said common files are accessible to an end-user regardless of which of said first and second portable storage media is presently in use by said end-user.

23. The method for transporting a Web site, via portable storage media, from one computer system to another computer system as recited in claim 17 further comprising the step of:

storing information from said first computer system onto said portable storage media, said information for facilitating off-line accessing of said information by an end-user, said information adapted to be transferred from said portable storage media to local storage space of said second computer system used by said end-user to access said information.

24. The method for transporting a Web site, via portable storage media, from one computer system to another computer system as recited in claim 17 further comprising the step of:

storing initialization software, a Web browser, a Web server, and a search server onto said portable storage media.

25. A method for emulating on-line accessing of information in an off-line environment comprising the steps of:

storing onto portable storage media, information configured to be displayed via an on-line connection, said portable storage media adapted to be used by an end-user in an off-line environment;

storing a first portion of said information onto a first portable storage medium via a virtual document root which emulates a document root of said information when accessed via said on-line connection;

storing a second portion of said information onto a second portable storage medium via said virtual document root which emulates said document root of said information when accessed via said on-line connection; and arranging said information on said portable storage media, wherein off-line accessing of said information emulates on-line accessing of said information such that linked information can be accessed in said off-line environment in the same manner as said linked information would be accessed via said on-line connection.

26. The method for emulating on-line accessing of information in an off-line environment as recited in claim 25, said method further comprising the step of:

prompting said end-user to switch from using said first portable storage medium to using said second portable storage medium when information requested by said end-user resides on said second portable storage medium instead of said first portable storage medium.

27. A computer-usable medium having computer-readable program code embodied therein for causing a computer to perform the steps of:

providing access to information stored onto portable storage media, said information configured to be displayed via an on-line connection, said portable storage media adapted to be used by an end-user in an off-line enviroment;

displaying said information to said end-user in said off-line enviroment to emulate accessing said information via an on-line connection such that linked information can be accessed in said off-line enviroment in the same manner as said linked information would be accessed via an on-line connection;

storing a first portion of said information onto a first portable storage medium via a virtual document root which emulates a document root of said information when accessed via said on-line connection; and storing a second portion of said information onto a second portable storage medium via said virtual document root which emulates said document root of said information when accessed via said on-line connection.

28. The computer-usable medium of claim 27 further having computer-readable program code embodied therein for causing a computer to perform the step of:

prompting said end-user to switch from using said first portable storage medium to using said second portable storage medium when information requested by said end-user resides on said second portable storage medium instead of said first portable storage medium.

29. A computer system comprising:

a processor;

an address/data bus coupled to said processor;

a computer readable memory coupled to communicate with said processor, said processor for performing the steps comprising of:

providing access to information stored onto portable storage media, said information configured to be displayed via an on-line connection, said portable storage media adapted to be used by an end-user in an off-line environment;

displaying said information to said end-user in said off-line environment to emulate accessing said information via an on-line connection such that linked information can be accessed in said off-line environment in the same manner as said linked information would be accessed via said on-line connection;

storing a first portion of said information onto a first portable storage medium via a virtual document root which emulates a document root of said information when accessed via said on-line connection; and storing a second portion of said information onto a second portable storage medium via said virtual document root which emulates said document root of said information when accessed via said on-line connection.

30. The computer system of claim 29 wherein said processor is further adapted to perform the step of:

prompting said end-user to switch from using said first portable storage medium to using said second portable storage medium when information requested by said end-user resides on said second portable storage medium instead of said first portable storage medium.

31. A method for transporting a Web site, via portable storage media, from one computer system to another computer system comprising the steps of:

storing from a first computer system, onto portable storage media, information configured to be displayed via an on-line connection;

arranging said information on said portable storage media, wherein off-line accessing of said information emulates on-line accessing of said information such that linked information can be accessed in said off-line environment in the same manner as said linked information would be accessed via said on-line connection;

loading said information from said portable storage media into a second computer system, wherein off-line accessing of said information from said second computer system emulates on-line accessing of said information from said first computer such that linked information can be accessed in said off-line environment in the same manner as said linked information would be accessed via said on-line connection;

storing a first portion of said information onto a first portable storage medium via a virtual document root which emulates a document root of said information when accessed via said on-line connection; and storing a second portion of said information onto a second portable storage medium via said virtual document root which emulates said document root of said information when accessed via said on-line connection.

32. The method for transporting a Web site, via portable storage media, from one computer system to another computer system as recited in claim 31 wherein said step of storing information onto portable storage media further comprises the step of:

prompting said end-user to switch from using said first portable storage medium to using said second portable storage medium when information requested by said end-user resides on said second portable storage medium instead of said first portable storage medium.

* * * * *